Nov. 12, 1935.                T. L. FAWICK                2,020,637
                                 CLUTCH
                           Filed Nov. 14, 1932          2 Sheets-Sheet 1

Inventor:
Thomas L. Fawick
By Brown, Jackson, Boettcher + Dienner
Attys.

Nov. 12, 1935.  T. L. FAWICK  2,020,637
CLUTCH
Filed Nov. 14, 1932   2 Sheets-Sheet 2
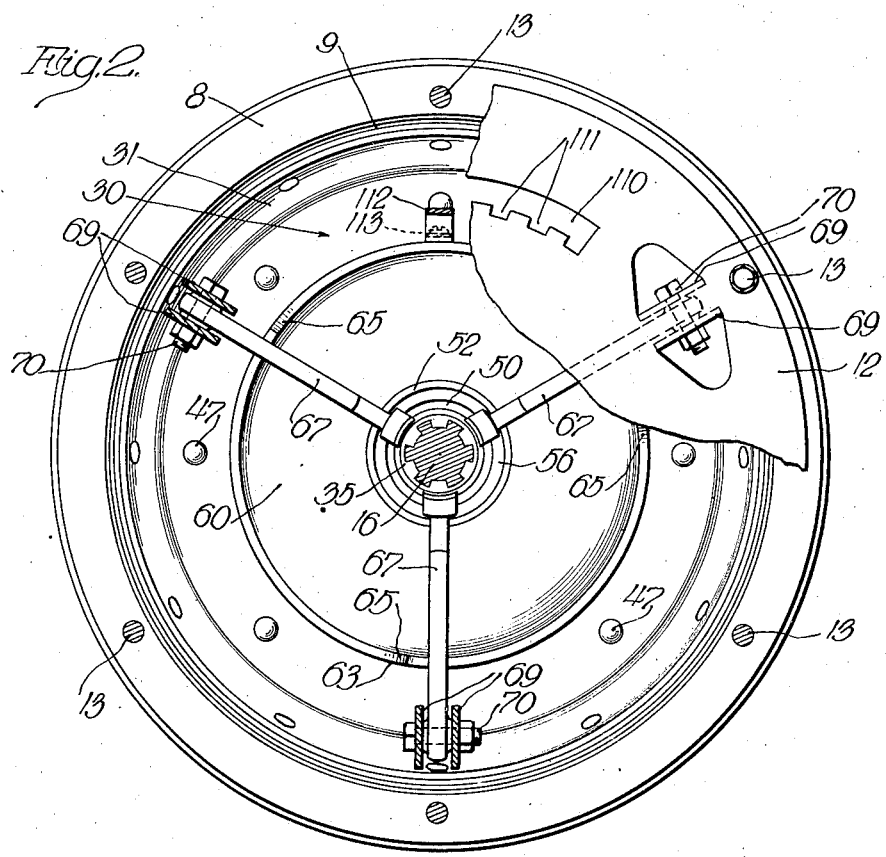
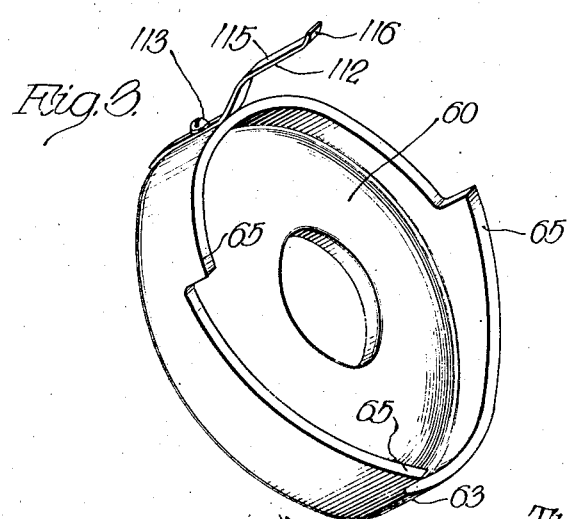
Inventor:
Thomas L. Fawick Patented Nov. 12, 1935

2,020,637

UNITED STATES PATENT OFFICE 2,020,637

CLUTCH

Thomas L. Fawick, Akron, Ohio, assignor to Fawick Manufacturing Co., Waukesha, Wis., a corporation of Wisconsin Application November 14, 1932, Serial No. 642,479

21 Claims. (Cl. 192—66)

The present invention relates generally to clutches and the like for connecting driving and driven parts together in power transmitting relation. More specifically, the present invention relates to spring operated clutches especially useful for motor cars, trucks, buses and in various types of industrial and agricultural machinery.

One of the principal objects of the present invention is the provision of a clutch of the type set forth above wherein conical clutch elements are employed. Cone clutches are well known and were the type generally employed in most of the early motor cars, but at the present time such clutches have been generally supplanted by clutches of the so-called disc or plate type. Cone clutches, however, have a number of advantages which are not present in the clutches of the latter type. Cone clutches are simple and are enabled, by virtue of the conical engaging surfaces, to transmit a considerable torque load without excessive spring pressures. Prior cone clutches, however, exhibited a tendency toward chattering or grabbing while being brought into engaging relation, and for these and other reasons cone clutches came to be considered as more or less undesirable for automotive work.

In the cone clutches of the prior art of which I am aware, the clutch member was slidably mounted, as by splines or the like, on the driven shaft and a spring or the equivalent was provided for sliding the cone clutch member along the driven shaft into engagement with the driving member, particularly, the fly wheel of the motor. Generally, also, the taper of the cone was small so that the clutch member necessarily had to be shifted on the driven shaft a substantial distance. During the operation of engaging the clutch, however, as soon as the conical surface of the clutch member first came into contact with the conical surface on the driving member a load was developed which was transmitted to the driven member through the splines or the equivalent along which the clutch member was being shifted. This loading of the splines then prevented the free sliding movement of the clutch member, so that the effect was for the clutch member to momentarily be stopped by the binding of the latter on the splines. The continued release of the clutch spring would, of course, subsequently shift the clutch member relative to the splines but this was accompanied by a jerking movement which, in turn, caused the cooperating frictionally engaging surfaces on the clutch member and the driving member to suddenly engage with a greater force causing a still greater jerk. In the old clutches, therefore, the succession of the engaging and releasing of the clutch surfaces and of the clutch member with respect to the splines caused the clutch to chatter and grab during the engaging operation.

According to the principles of the present invention, I have eliminated all of these objectionable features of the cone clutch while still retaining all of the advantages of such a clutch. In the first place, according to the present invention, I have increased the angle of the tapered or conical portions so that less opportunity is afforded for the grabbing and releasing of the cooperating clutch surfaces, and in the second place, I have freed the conical clutch member proper from the splined clutch hub. That is to say, I have provided a clutch wherein the clutch member proper is shiftable into and out of driving engagement without necessarily requiring the clutch hub member itself to slide on the splines. This is an important feature. In a clutch constructed in accordance with the principles of the present invention, if during the operation of engaging the clutch there is any tendency for the clutch hub to bind on the splines of the driven shaft the soft easy movement of the clutch member proper into driving engagement with the driving member will not be affected in the least, because if the clutch hub tends to stick the clutch member proper, being movable with respect to the clutch hub, merely continues its engaging movement under control at all times of the clutch spring and the operator. It is necessary, nevertheless, to provide for the transmission of torque from the clutch member proper to the driven member and, in order to secure this result while permitting the clutch member to shift relative to the hub, I have provided flexible or resilient means connecting the clutch member with the splined hub so that should, for any reason, the splined hub stick or bind on the driven shaft the resilient means merely flexes to permit the continued and controlled engaging movement of the clutch member proper. The resilient or flexible means preferably takes the form of a flexible disc of steel or other material arranged to permit relative axial movement between the hub member and the clutch member but providing for the effective transmission of torque therebetween. Preferably, the flexible or resilient steel disc is securely fastened to both the hub member and the clutch member.

Another object of the present invention is the provision of a cone clutch construction wherein multiplying levers are provided for multiplying the pressure of the clutch spring. By virtue of this construction, which so far as I am aware has never before been accomplished in a cone clutch, a relatively light spring may be employed, which makes for easy operation of the clutch. Another object of the present invention is the provision of a cone clutch wherein a cover plate is provided and which is utilized as a support or fulcrum means for the pressure multiplying levers.

Still another object of the present invention is the provision of new and improved adjusting means for adjusting the tension of the clutch spring or its equivalent, which adjusting means is of simplified construction and capable of being conveniently operated without dismantling any of the clutch structure. Specifically, the present invention contemplates the provision of a rotatable pressure plate having circumferentially disposed cams or inclines against which the clutch spring means reacts in urging the clutch member towards driving engagement, the pressure plate with its inclines being rotatable to increase or decrease the effective tension of the spring means. Preferably, the means for rotating the pressure plate is so constructed and arranged as to be operated from outside the clutch housing, and to this end the cover plate of the clutch includes an arcuate slot through which a spring finger projects and which is secured to the pressure plate. The slot is notched and the spring finger may be engaged in any of the notches to hold the pressure plate in adjusted position.

Still further, another object of the present invention is the provision of a cone clutch of such construction that the same may be disposed within the space normally provided for single plate clutches of conventional construction. To this end, the central portion of the clutch member and the bearing means for the pressure plate associated therewith are disposed within the circumferential confines of the conical portion of the clutch member so that my improved cone clutch is of compact construction and can be disposed within the space normally allowed for conventional clutches of other types.

These and other objects of the present invention will be apparent to those skilled in the art after a consideration of the following detailed description of the preferred embodiment, taken in conjunction with the accompanying drawings illustrating such embodiment in which:

Figure 2 is a transverse vertical section taken along the line 2—2 of Figure 1, certain parts being broken away in order to better illustrate the relations involved; and Figure 3 is a perspective view showing the pressure plate having the inclined cam surfaces and the spring finger associated therewith and used to secure adjustment of the pressure plate.

Figure 1:
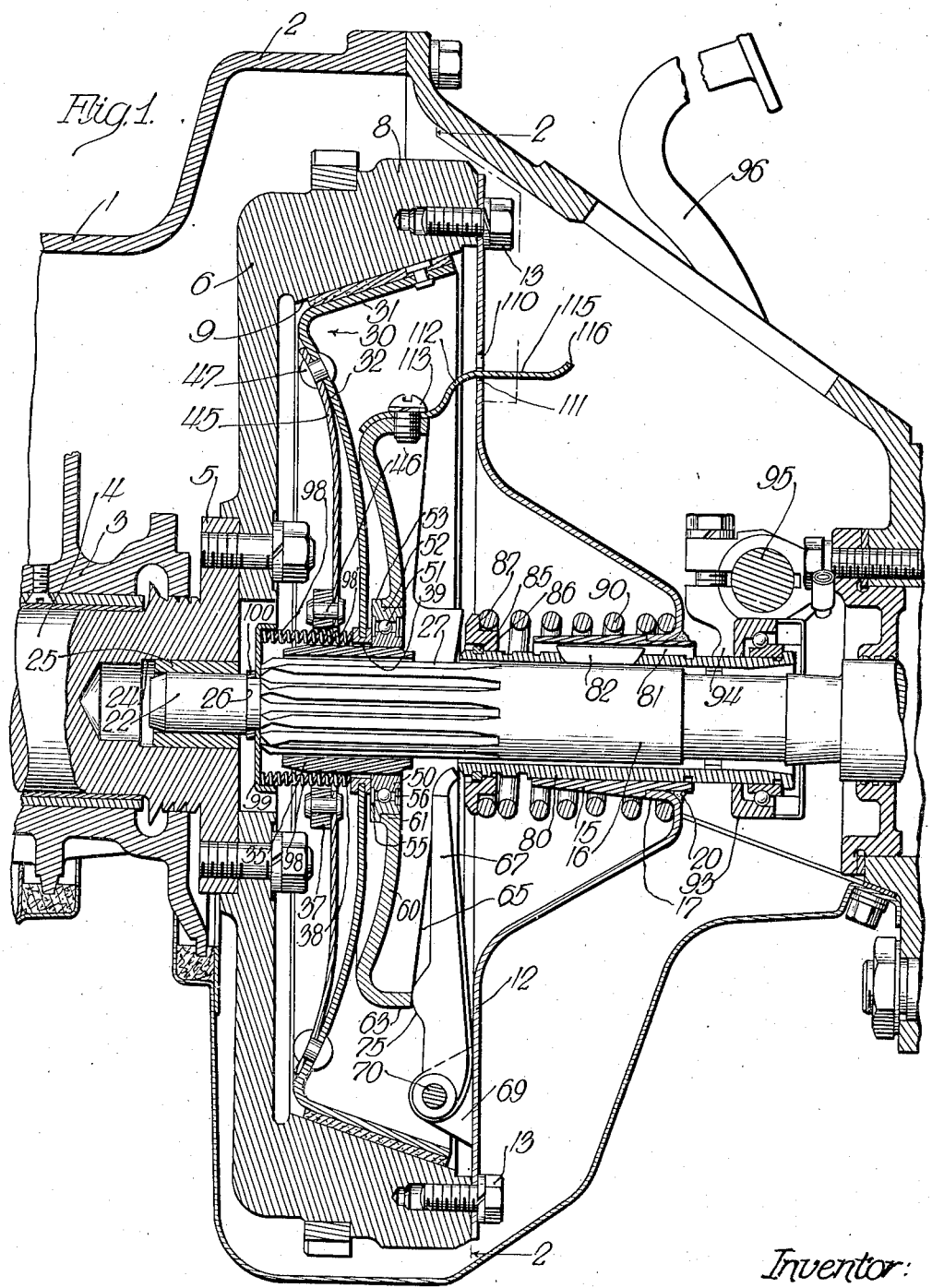
Figure 1 is a vertical longitudinal section taken longitudinally through the driving and driven shafts and the associated clutch parts.

Referring more particularly to Figure 1, the reference numeral 1 indicates the crank case of an automobile motor terminating in a housing 2 enclosing the fly wheel and the associated clutch mechanism. The crank case 1 includes a suitable journal portion 3 for rotatably receiving the rear end of the crank shaft 4 which is suitably flanged, as at 5, to receive a fly wheel 6 which serves as the driving member for the clutch. The fly wheel 6 is of more or less conventional construction and is provided with a rim 8 which is formed interiorly with a conical driving surface 9 with which certain parts of my novel clutch construction cooperate. A clutch cover plate 12 is secured to the rim 8 of the fly wheel, as by cap screws 13, and the cover plate 12 is formed with a central hub portion 15 within which is disposed the driven member or shaft 16. Preferably, the clutch cover plate 12 is formed of pressed metal or the equivalent and is provided with a central re-entrant portion 17 to which the hub or sleeve 15 is secured by welding or the like, as indicated by the reference numeral 20. This particular construction of the clutch cover affords strength with lightness so that the weight of the rotating parts is kept down to a desirable minimum. The hub 15 may be a forging, casting or the like. The forwardmost end of the driven shaft 16 is reduced, as indicated by the reference numeral 22, and is received within a correspondingly formed bore 24, being journaled therein by suitable bearing or bushing means 25, whereby the driving and driven shafts are maintained in axial alignment. Just rearwardly of the reduced end 22 is a groove 26 and a splined portion 27 upon which certain parts of the clutch are mounted.

The clutch member proper is indicated by the reference numeral 30 and includes a rigid cone stamping 31 having a radially outer or peripheral portion formed as a section of a cone and with an angle corresponding to the angle of the conical driving surface 9. Preferably, this angle is approximately 18 degrees, somewhat in excess of the angle formerly used in cone clutches of earlier types. The conical outer surface of the cone stamping 31 is faced with suitable friction material, such as leather, asbestos, and the like, and the central portion of the clutch member 30 is dished, as indicated at 32, to dispose the radially inner portion of the clutch member within the confines of the conical portion 31. As will be later described in detail, this makes for a compact clutch construction. Preferably, the cone stamping is formed also of pressed metal, such as steel, aluminum or the like.

The splined portion 27 of the driven shaft 16 carries a clutch hub 35 slidable thereon but maintained by the splines in non-rotatable relation therewith. The hub 35 is provided with a radial flange 37 and an extended cylindrical portion 38. The clutch member 30 is slidable with respect to the cylindrical portion 38 of the clutch hub and for this purpose the radially inner portion of the dished section 32 is provided with a collar 39 shiftable along the cylindrical portion of the hub 35. The hub and the rigid cone stamping are held in driving or torque transmitting relation by means of a flexible disc member 45 which is secured to the radial flange 37 of the clutch hub by rivets 46 and, at its radially outer edge, is connected with the cone stamping 30 by rivets 47. The disc member 45 is formed of resilient material and is capable of transmitting the torque from the clutch member 30 to the clutch hub 35 while yet providing for or permitting relative axial movement between the clutch stamping 30 and the hub 35.

A collar 50 is also slidably mounted on the cylindrical portion 38 of the clutch hub 35 and is disposed in abutting relation with the collar 39 carried by the dished portion of the clutch member 30. If desired the collar 50 may be secured to the clutch member or to the collar 39. The collar 50 serves as an inner race for ball bearing means 51, the outer race therefor being indicated by the reference numeral 52 and including a radially outwardly disposed flange 53 and suitable grooves receiving two pressed shields 55 and 56 which are pressed into the outer race or collar 52 and rotatable therewith. The two steel shields fit in correspondingly formed grooves in the collar 50 but are free to rotate with respect thereto. The purpose of the shields is to hold oil or other lubricant in the bearings 51 while preventing the entrance of dust and dirt. Being disposed against the collar 39, the bearings 51 and the associated races 50 and 52 are positioned within the confines of the conical portion 31 of the clutch member.

A pressure plate 60 is carried upon the outer race 52 and has its central portion dished and terminating in a small flange 61 which is adapted to bear against the radial flange 53 on the outer race or collar 52. As will be apparent from Figure 1, the dished portion of the pressure plate 60 follows quite closely the curvature of the cone stamping 30 and terminates in a flange 63 which has its edge formed in a plurality of circumferential or peripheral inclines or cam surfaces 65. These inclined or cam surfaces 65 are engaged by the intermediate portions of pressure applying levers 67.

The pressure applying levers 67 are fulcrumed on the cover plate 12, each of the levers being pivotally mounted thereon between a pair of lugs or ears 69 punched from the body of the cover plate 12, as best shown in Figures 1 and 2 and bent up at right angles to the plane thereof. The levers 67 are connected between the associated ears 69 by a pivot pin 70 or the equivalent. At their intermediate portions, which are in contact with the inclined surfaces 65, the pressure levers 67 are provided with raised bosses 75.

For applying pressure through said levers to the clutch member 30, a sleeve is disposed over the driven shaft 16 and slidably received within the hub 15 of the cover plate 12. Preferably, the hub 15 is provided with a slot 81 and a key 82 is carried by the sleeve 80 and is slidable within the slot 81. In this way the sleeve 80 is rotatable with, but slidable axially of, the cover plate 12 and the driving member 6. The innermost end of the sleeve member 80 is formed to engage the radially inner ends of the pressure levers 67. This end of the sleeve 80 is provided with a groove to receive a split ring 85 which serves to hold a collar 86 in place thereon. Biased between a flange 87 on the collar 86 and the central portion of the cover plate 12 is a clutch spring 90, this spring encircling the hub member 15 and held in position thereby. The spring 90 is tensioned to shift the sleeve 80 toward the left in Figure 1, thereby tending to rock the levers 67 so that their inner ends move toward the fly wheel 6. This causes a similar although smaller movement of the pressure plate engaging bosses 75, which thereby act through the pressure plate to apply a multiplied clutch engaging pressure on the clutch member 30, causing the latter to move toward the conical driving surface 9 on the fly wheel 6. The rear end of the sleeve member 80 is provided with more or less conventional thrust bearing means 93 with which a yoke or a throw-out member 94 cooperates, the latter member being carried upon a shaft 95 journaled within the transmission or clutch housing. A clutch pedal 96 of conventional construction is connected with the outer end of the clutch shaft 95. A plurality of springs 98 are disposed between the forward end of the collar 39 and a flanged disc 99 which is disposed within the small groove 26 between the splined portion 27 and the reduced portion 22 by a ring 100, the springs extending through openings 98' formed in the flange 37.

The pressure plate 60 is rotatable with respect to the levers 67 to increase or decrease tension of the spring 90. Obviously, if the pressure plate 60 is rotated to bring the higher portions of the cam surfaces 65 in contact with the bosses 75, the spring 90 is placed under greater tension than is the case when the opposite portions of the inclines 65 engage the levers 67. For the purpose of rotating the pressure plate 60 and retaining the same in adjusted position, the cover plate 12 is slotted, as at 110, the slot being provided with a number of notches 111. A spring finger 112 projects through the slotted portion of the cover plate 12 and is securely fastened to the pressure plate by means of a screw 113. The spring finger 112 is provided with an axially extending portion 115 which is engageable with any one of the notches 111 and an upturned end 116 formed to facilitate grasping the spring finger 112 to release it from the notch 111 and to use the same in rotating the pressure plate 60. The axially extending portion 115 accommodates the relative movement between the pressure plate 60 and the cover plate 12 when the clutch is engaged and released.

The operation of the clutch construction described above is substantially as follows. When the clutch is fully engaged the power is transmitted from the driving surface 9 of the fly wheel through the interposed friction material to the conical portion of the clutch member 30. This member is free of the clutch hub 35 but the torque is transmitted to the latter through the flexible disc member 45 which is riveted to both the clutch member 30 and the clutch hub but which has sufficient flexibility or resiliency to permit axial movement of the clutch member with respect to the hub member. The clutch member 30 is maintained in frictional engagement with the fly wheel by the pressure of the spring 90 acting through the collar 86 at the end of the sleeve member 80 against the radially inner ends of the levers 67. These levers act as pressure multiplying members, affording a multiplication of approximately 3½ to 1. This multiplied pressure of the spring 90 is applied to the peripheral portion of the pressure plate 60 and transmitted through the bearing means 51 to the radially inner portion of the rigid cone stamping 30, forcing the latter into frictional driving engagement with the fly wheel 6.

The clutch is released by depressing the clutch pedal 96 in the usual manner, which rocks the yoke 94 and shifts the sleeve member 80 toward the right as viewed in Figure 1 thereby compressing the spring 90 and releasing the inner ends of the pressure applying levers 67 of the spring pressure. The springs 98 biased between the disc 99 and the forward end of the collar 39, are then operative to shift the cone stamping toward the right in Figure 1, to move the conical portion 31 of the clutch member out of engagement with the fly wheel 6. When the clutch is to be engaged again, the pressure on the pedal 96 is gradually released, thereby permitting the spring 90 to act through the levers 67 and the pressure plate 60 to apply multiplied pressure to the radially inner portion of the clutch member 30 to shift the same toward the fly wheel 6. During this initial movement the hub member 35 slides on the splines 27 as the clutch member 30 is shifted.

In the old cone type of clutches, as soon as the cooperating clutching surfaces initially came into contact there would be some transmission of power from the driving to the driven member, which was transmitted through the clutch member and the splined hub. This would cause a loading on the splines which interfered with the free sliding movement of the clutch member. The hub portion thereof would then tend to bind and the free sliding movement of the clutch member would be interfered with. When the pressure of the clutch spring would be released to a greater extent sufficient to cause the clutch to slide on the splines, then the cooperating clutching surfaces would suddenly engage to a greater extent and would therefore transmit a greater force through the clutch member and the hub member to the driven member, thereby again causing the hub to seize the splines and to again bind thereon. It was therefore again necessary to release the clutch spring to a greater extent to establish a sufficient force to shift the clutch member with respect to the driven member, and again the clutching surfaces would transmit a greater force and the process of releasing and binding of the clutch hub on the driven shaft would be repeated. Thus, in the old clutches, engagement of a clutch was accomplished in a series of chattering or grabbing actions which was extremely objectionable and imposed impact shocks on the transmission mechanism.

In my improved clutch, however, these objectionable features have been eliminated by freeing the clutch member from the hub member and in providing for relative movement therebetween while yet securing an effective transmission of power between the clutch member and the hub. In the present construction, as the spring 90 is released and its force applied toward shifting the clutch member 30 towards the conical driving surface 9, the instant these cooperating surfaces come into engagement there is a transmission of power between the drive wheel 6 and the driven member 16, and this may cause the hub member 35 to momentarily bind on the splines 27 as in prior clutches. This does not, however, affect the engaging movement of the clutch member 30 because the latter is free to move with respect to the hub by virtue of the resilient disc 45. Thus, should the hub member 35 bind on the splines while the clutch is being engaged, the hub member 35 merely stops moving with the clutch member 30 and remains in frictional engagement with the splines 27, the clutch member 30 going forward smoothly into full driving engagement with the driving member until the full multiplied pressure of the spring 90, acting through the levers 67, is applied to maintain the two clutch parts in frictional driving engagement.

Whether or not the clutch hub 35 binds on the splines 27 during the clutch engaging movement is of no consequence in the present construction and does not in any way affect the smooth engagement of the two clutch members. While the flexible disc 45 has sufficient resiliency to permit the relative movement between the clutch member and the hub member, yet this disc member has sufficient strength to transmit power from the fly wheel 6 to the driven member 16. In prior constructions the clutch member was released by pressure on the clutch throw-out yoke, but in the present construction and as described above, when the lever 96 is depressed the spring 90 is compressed thereby releasing the clutch levers 67 of the pressure, but no direct pressure is applied by the clutch pedal 96 on the clutch member 30. The springs 98 act against the stamping 30 extending about the hub to press the cone stamping away from the fly wheel 6.

By virtue of the increased taper employed the required movement of the clutch member 30 is reduced, this increased taper being made possible by the multiplication of power derived through the levers 67. By virtue of this last mentioned feature, it is also possible to employ a lighter spring 90 than was heretofore possible. This spring 90, in connection with mounting the pressure multiplying levers on the cover plate for the clutch, is of considerable importance in the present invention. In connection with the use of the relatively light springs 98 for releasing the clutch member, it is to be understood that other forms of spring means may be employed, as, for example, one spring acting directly against the radially flanged portion 37 of the hub.

From Figure 1 it will be apparent that the heat generated by the clutch will be quickly dissipated because of the excessive area of the conical portion 31 which is exposed to the air, the heat generated being dissipated by the fly wheel 6 and the exposed area of the clutch member just mentioned. It is also to be noted that it is a relatively simple matter to adjust the clutch. All that is necessary is to lift the spring finger out of one of the notches and shift the pressure plate 60 angularly about its axis and releasing the spring finger and allowing it to engage another notch on the cover plate. In this operation if the clutch pedal 96 is depressed, thereby releasing the clutch levers 67 of the pressure thereof, the adjustment mentioned will be greatly facilitated. However, by virtue of the relatively great taper of the conical surfaces and by virtue of the relatively low ratio of multiplication, adjustment of the clutch constructed according to the principles of the present invention will be required only at relatively long intervals.

While I have described above the preferred construction, it will be at once apparent that my invention is not to be limited to the specific details shown and described but that, in fact, widely different means may be employed in the practice of the broader aspects of my invention.

What I claim, therefore, and desire to secure by Letters Patent is:

1. A clutch comprising a driving member, a driven member, a clutch member movable into and out of driving engagement with said driving member, a hub member splined onto the driven member and capable of limited axial movement thereon, flexible torque transmitting means connecting said clutch member and the hub member and capable of transmitting torque from the clutch member to the driven member and providing for relative axial movement between the clutch member and the hub member, a collar slidably mounted on one end of said hub member, means associated with said collar for urging the clutch member into driving engagement with said driving member, and spring means reacting against one end of said collar and acting through said flexible means for urging the clutch member out of engagement with the driving member.

2. A cone clutch comprising a driving member having a conical driving surface, a driven member in the form of a shaft having splines thereon, a hub member having a sliding fit on the splined portion of said driven shaft, a conical clutch member movably mounted on said hub member and within the length of said hub member and shiftable into and out of driving engagement with said driving surface on the driving member, torque transmitting means connected between said conical clutch member and said hub member and arranged to be flexible in an axial direction to permit relative axial movement between the hub member and the conical clutch member, and means independent of said hub member and reacting against said conical clutch member for urging the latter into driving engagement with the driving member.

3. A clutch comprising a driving member having a conical driving surface, a driven shaft, a conical clutch member movable into and out of frictional engagement with the driving surface of said driving member, a hub member splined for sliding movement on said driven shaft and slidably receiving said conical clutch member, flexible torque transmitting means connected between said hub member and said clutch member providing for relative movement therebetween, a plurality of levers carried by said driving member and reacting against said clutch member, and spring means engaging the inner ends of said levers to apply a multiplied pressure to said clutch member to urge the same into driving engagement with said driving member.

4. A clutch comprising a driving member having a conical driving surface, a driven shaft, a conical clutch member movable into and out of frictional engagement with said driving surface, cooperating conical surfaces on said driving member and said clutch member making an angle greater than fifteen degrees with respect to the axes of said members, a hub member slidably and non-rotatably carried by said driven shaft, said hub member slidably receiving the radially inner portions of said conical clutch member, flexible torque transmitting means connecting said conical clutch member with said hub member and providing for said relative movement therebetween, a pressure plate rotatably associated with said conical clutch member and arranged to apply pressure thereto, a plurality of substantially radially disposed levers fulcrumed on said driving member and reacting against said pressure plate, and spring means disposed around the driven shaft and acting against the radially inner ends of said levers to apply a multiplied pressure through said levers and pressure plate to said clutch member to urge the same into driving engagement with said driving member.

5. A clutch comprising a driving member having a conical driving surface, a driven shaft, a conical clutch member movable into frictional engagement with said driving surface, said cooperating conical surfaces making an angle of at least eighteen degrees with respect to the axes of said members, a hub member splined on said driven shaft and slidably supporting said clutch member, flexible torque transmitting means connecting said clutch member with said hub member while providing for free relative movement therebetween, a cover plate secured to the driving member and enclosing said clutch member, a plurality of levers fulcrumed at their radially outer ends on said cover plate, a pressure plate rotatably associated with said clutch member and having its radially outer portions engageable by the intermediate portions of said levers, spring means biased between said cover plate and the inner ends of said levers for applying through said pressure plate a multiplied pressure on said clutch member, and means for adjusting the relation between said pressure plate and the levers to vary the effective tension of said spring means.

6. A clutch comprising a driving member having a conical driving surface, a driven shaft, a conical clutch member movable axially into and out of driving engagement with said surface, a hub member slidably and non-rotatably mounted on said driven shaft, means slidably supporting said clutch member on said hub member, a flexible disc connecting said hub member with the radially outer portions of said clutch member and capable of transmitting torque therebetween while providing for relative movement between said members, a pressure plate rotatably associated with said clutch member and having a plurality of circumferentially inclined portions, a cover plate secured to said driving member, a plurality of substantially radially disposed levers fulcrumed on said cover plate and having their intermediate portions engageable with said inclined portions of the pressure plate, spring means biased between said cover plate and the inner ends of said levers for exerting through said pressure plate a multiplied force for urging said clutch member into driving engagement with said driving member, said pressure plate being rotatable with respect to said levers to shift said inclined portions relative to the levers to adjust the tension of said spring means, and means cooperating with said pressure plate and said cover plate for holding the pressure plate in adjusted position.

7. A cone clutch of the class described comprising a driving member having a conical driving surface, a driven shaft coaxially disposed with respect to said driving member, a conical clutch member movable into and out of driving engagement with said driving surface and shiftable axially of said driven shaft, flexible torque transmitting means connecting said clutch member with the driven shaft and providing for said relative movement therebetween, a cover plate secured to said driving member, a pressure plate rotatably associated with said clutch member and having a cam surface, spring means biased between said cover plate and said pressure plate and including means engageable with said cam surface, said cover plate having a notched slot formed therein, and a resilient member secured to said pressure plate and projecting through said slot to the exterior of said cover plate to provide for shifting said pressure plate to effect adjustment of the tension exerted upon the clutch member by said spring means.

8. A clutch comprising a driving member, a driven member, a clutch member movable relative to the driving member into and out of driving engagement therewith, torque transmitting means connecting the clutch member with said driven member, a pressure plate operatively associated with said clutch member, a cover plate secured to the driving member, said pressure plate being provided with at least one arcuately inclined cam surface, spring means biased between said cover plate and the cam means on said pressure plate for pressing the clutch member into driving engagement with the driving member, said pressure plate being rotatable with respect to said cover plate and the associated spring means for adjusting the tension of the latter, and releasable means connected between the pressure plate and the cover plate for maintaining the pressure plate in adjusted position.

9. A clutch comprising a driving member, a driven member, a clutch member movable relative to the driving member axially into and out of driving engagement therewith, torque transmitting means connecting the clutch member with said driven member, a pressure plate for the clutch member rotatably associated therewith and provided with a plurality of arcuately formed inclined portions, a cover plate secured to the driving member, a plurality of levers fulcrumed at their radially outer portions on said cover plate and having their intermediate portions engageable with the inclined portions of said pressure plate, spring means biased between said cover plate and the radially inner ends of said levers, said pressure plate being rotatable with respect to said levers and acting through said inclined portions for increasing or decreasing the tension of said spring means and said cover plate being formed with an arcuately arranged notched slot, and a spring finger secured to said pressure plate and projecting through said slot and engageable in any one of the notches therein for releasably maintaining said pressure plate in adjusted position.

10. A clutch plate assembly comprising a hub member, a clutch member having frictional material at its radially outer portions, said clutch member having a radially extending portion mounted at its inner periphery upon and within the length of said hub member for angular and axial movement free of said hub member, and flexible torque transmitting means secured to the hub member and to the clutch member and providing for limited axial movement of said members relative to each other while maintaining torque transmitting relation therebetween.

11. A clutch plate assembly comprising a hub member, a clutch member having frictional material at its radially outer portion and a collar at its radially inner portion, said collar being slidably mounted on said hub member, resilient torque transmitting means connected between said hub member and the clutch member radially outwardly with respect to the collar thereof, said resilient means providing for relative movement between the clutch member and the hub member while maintaining effective torque transmitting relation therebetween, bearing means associated with said collar, and a pressure plate mounted upon said bearing means.

12. A clutch plate assembly comprising a splined hub member, a cone clutch member having a conically formed radially outer portion and its radially inner portion slidably mounted on said hub member, a collar associated with the radially inner portion of said cone clutch member, a flexible disc secured to the hub member and to the cone clutch member adjacent the radially outer portions thereof and operative to provide for relative movement between the cone clutch member and the hub member while maintaining torque transmitting relation therebetween, bearing means associated with said collar and including at opposite sides thereof shields to prevent loss of lubricant therefrom and an outer race having a radial flange formed thereon, and a pressure plate carried by said outer race and disposed against the flange thereof.

13. A clutch plate assembly comprising a hub member, a cone clutch member having conically formed outer portions and a dished central portion slidably mounted on said hub member, a flexible disc connecting said hub member with the cone clutch member radially inwardly of said conical portions, said dished portion and said flexible disc being disposed within the circumferential confines of said conical portions, bearing means associated with the central dished portion of the clutch member, and a pressure plate carried by said bearing means and reacting against said dished portion of the clutch member.

14. A clutch comprising a driving member, a driven member, a clutch member movable relative to the driving member into and out of driving engagement therewith, torque transmitting means connecting the clutch member with said driven member, a pressure plate operatively associated with said clutch member, a cover plate secured to the driving member, said pressure plate being provided with three cam surfaces, spring means biased between said cover plate and the cam surfaces on said pressure plate for pressing the clutch member into driving engagement with the driving member, said pressure plate being rotatable with respect to said cover plate and the associated spring means for adjusting the tension of the latter, and a snap spring carried by the pressure plate and engageable with the cover plate for maintaining the pressure plate in adjusted position.

15. In a clutch adapted to connect driving and driven shafts, a pair of cooperating clutch members connected, respectively, with said shafts, spring means reacting against one of said clutch members for pressing the other member into frictional engagement therewith, a pressure plate separate from said clutch members and rotatably mounted with respect to the driven shaft for transmitting clutch applying pressure, and means for rotating said plate relative to the driven shaft and free of said clutch members for adjusting the effective tension of said spring means.

16. A clutch comprising a driving member, a driven member, a clutch member movable relative to the driven member into and out of driving engagement with said driving member, flexible torque transmitting means operatively connecting said clutch member and said driven member and providing, by said flexibility, for the relative movement between said members, and spring means between the clutch member and an axially fixed abutment on the driven member and adapted to shift said clutch member out of driving engagement with the driving member, said axially fixed abutment being independent of the operative connection between the flexible torque transmitting means and the driven member.

17. In a cone friction clutch, a driving member having a conical clutch surface, a clutch member having a conical clutch surface for cooperation with the conical clutch surface of said driving member, force multiplying levers, spring means for actuating said force multiplying levers to engage the conical clutch surface of said clutch member with the conical clutch surface of said driving member, means for releasing the clutch member actuating action of said spring means, and spring means for actuating said clutch member to disengage the conical clutch surface thereof from the conical clutch surface of said driving member.

18. In combination, a driving member having a clutch surface, a clutch member having a clutch surface for engagement with the clutch surface of said driving member, force multiplying levers, spring means for actuating said force multiplying levers to engage the clutch surface of said clutch member with the clutch surface of said driving member, a radially extending member mounted adjacent the axis of said clutch member and having its outer margin turned laterally for cooperation with said force multiplying levers, and means for turning said radially extending member to present different portions of the laterally turned margin of said member for cooperation with said force multiplying levers whereby to adjust the tension exerted upon the clutch member by said spring means.

19. In combination, a driving member having a part provided with a conical clutch surface, a driven member having a clutch part provided with a cooperating conical clutch surface, spring means coiled about the driven member for actuating said clutch part to engage the conical clutch surface thereof with the conical clutch surface of the part on the driving member, force multiplying levers between said spring means and the clutch part on the driven member, and means free of said force multiplying levers for releasing the clutch member actuating action of said spring means.

20. In combination, a driving member having a part provided with a conical clutch surface, a driven member, a clutch member having a conical clutch surface for engagement with said first conical clutch surface, said clutch member having a generally radially extending portion free angularly and endwise of said driven member, a flexible metallic plate connected to said clutch member and mounted angularly fast but endwise free upon said driven member, and spring means passing across the plane of said plate for shifting the clutch member out of engagement with the driving member.

21. In combination, a driving member having a part provided with a conical clutch surface, a driven member, a sleeve splined for axial movement on said driven member, a clutch member having a conical clutch surface for engagement with said first conical clutch surface, said clutch member having generally radially extending portions free angularly and endwise of said sleeve, a flexible metallic plate connected at its outer end to said clutch member and at its inner end to said sleeve, and a pressure plate mounted upon said sleeve and cooperating with the inner portions of the generally radially extending portions of said clutch member.

THOMAS L. FAWICK.